United States Patent [19]
Engel et al.

[11] Patent Number: 5,900,159
[45] Date of Patent: May 4, 1999

[54] METHOD FOR SEPARATING LIQUID FROM A SLURRY

[75] Inventors: Dirk Coenraad Engel; Geert Van Der Honing, both of Amsterdam, Netherlands

[73] Assignee: Shell Oil Company, Houston, Tex.

[21] Appl. No.: 08/806,879

[22] Filed: Feb. 25, 1997

[30] Foreign Application Priority Data

Feb. 29, 1996 [EP] European Pat. Off. .............. 96200532

[51] Int. Cl.⁶ ............................ B01D 21/26; B01D 29/00
[52] U.S. Cl. ........................ 210/788; 210/787; 210/805; 210/806; 210/188; 210/416.1; 55/459.1; 55/466; 95/46; 95/241; 95/259; 95/269
[58] Field of Search ................................. 210/188, 416.1, 210/787, 788, 799, 805, 806; 55/459.1, 466; 95/46, 241, 259, 269

[56] References Cited

U.S. PATENT DOCUMENTS

| | | | |
|---|---|---|---|
| 4,909,950 | 3/1990 | Katoh et al. | 210/304 |
| 5,035,799 | 7/1991 | Rosberg et al. | 210/416.1 |

*Primary Examiner*—David A. Reifsnyder

[57] ABSTRACT

The present invention relates to a method for separating liquid from a slurry of solid particles and liquid contained in a vessel in the presence of a gas, which comprises degasifying the slurry and passing the degasified slurry through a cross-flow filter, and separating the degasified slurry into the liquid and a concentrated slurry. The present invention further relates to a process for the preparation of heavy hydrocarbons, which process comprises contacting a synthesis gas in a reactor vessel with a slurry of solid catalyst particles and a liquid, thereby producing heavy hydrocarbons, and separating the liquid containing heavy hydrocarbons from the slurry by the said method.

8 Claims, 2 Drawing Sheets

METHOD FOR SEPARATING LIQUID FROM A SLURRY

FIELD OF THE INVENTION

The present invention relates to a method for separating liquid from a slurry of solid particles and liquid contained in a vessel. In a further aspect, the present invention relates to the use of such a method in a process for the preparation of heavy hydrocarbons which process comprises contacting a mixture of hydrogen and carbon monoxide in a three-phase slurry reactor with a slurry of solid catalyst particles and a liquid.

BACKGROUND OF THE INVENTION

Three-phase slurry reactors are well known to those skilled in the art. In operation, the said reactors typically comprise a slurry zone and a freeboard zone. In the slurry, present in the slurry zone, the solid catalyst particles are kept in suspension in the liquid. The liquid serves amongst others as a heat-transfer medium. One or more gaseous reactants bubble through the slurry. The freeboard zone, usually located above the slurry zone, contains primarily gaseous products and/or reactants and substantially no slurry.

The catalyst particles are typically kept in suspension by stirring or agitation by a mechanical device or, preferably, by an upward gas and/or liquid velocity.

The mixture of hydrogen and carbon monoxide is commonly referred to as synthesis gas. The preparation of heavy hydrocarbons from synthesis gas is commonly referred to as Fischer-Tropsch synthesis. The term heavy hydrocarbons as used herein refers to hydrocarbons which are in the liquid state under reaction conditions. In this respect, it will be appreciated by that the Fischer-Tropsch synthesis not only yields heavy hydrocarbons, but also hydrocarbons which are gaseous under reaction conditions and oxygenates.

In particular, the present invention relates to the separation from the slurry of heavy hydrocarbons produced by the Fischer-Tropsch synthesis.

A number of ways have been proposed to separate liquid, in particular heavy hydrocarbons, from the slurry. Thus, European patent application publication No. 0 609 079 describes a slurry bubble column containing a slurry bed of catalyst particles suspended in a liquid. A filtration zone is located in the slurry bed, in particular close to the upper surface of the slurry bed. The filtration zone typically comprises a plurality of filter elements. The filter elements are typically of elongate cylindrical form and comprise a cylindrical filtering medium enclosing a filtrate collection zone.

European patent application publication No. 592 176 describes a filtration zone consisting of a tube sheet holding filter cartridges. The tube sheet defines the upper surface of the slurry bed.

International (PCT) application publication No. 94/16807 describes a filtration zone surrounding the slurry bed.

UK patent application publication No. 2 281 224 discloses a reactor containing a plurality of reaction tubes arranged to accommodate the slurry bed. The upper part of each tube contains a filter element to separate hydrocarbon product from slurry, and a top part of increased diameter, often referred to as a disengagement zone, to separate gas from the slurry.

U.S. Pat. No. 4,605,678 describes separation of catalyst from a slurry containing hydrocarbon product by passing the slurry through a high gradient magnetic field.

U.S. Pat. No. 5,324,335 describes a process for the preparation of hydrocarbons, using an iron-based catalyst. To avoid the continuous increase of slurry height in the reactor vessel, due to the production of heavy hydrocarbon waxes, wax is separated from the slurry using a cross-flow filter located outside the reactor vessel.

German patent No. 32 45 318 (DE-32 45 318) describes a process for separating a liquid product stream from a slurry, by cross-flow filtration, which is carried out at substantially reactor pressure, but outside the reactor. According to one embodiment, the slurry is cooled prior to filtration.

It has now been found that cross-flow filtration is considerably facilitated if the cross-flow filtration step is preceded by a degasification step, which step is preferably carried out in a device in which separation takes place in a centrifugal field, more preferably a hydrocyclone. Furthermore, in this way the control of the flow of filtrate through the cross-flow filter is considerably facilitated. In addition, it will be appreciated that the required filter area is less.

SUMMARY OF THE INVENTION

Therefore, the present invention relates to a method for separating liquid from a slurry of solid particles and liquid contained in a vessel in the presence of a gas, which comprises degasifying the slurry and passing the degasified slurry through a cross-flow filter, thereby separating the degasified slurry into the liquid and a concentrated slurry.

DETAILED DESCRIPTION

Figure 1:
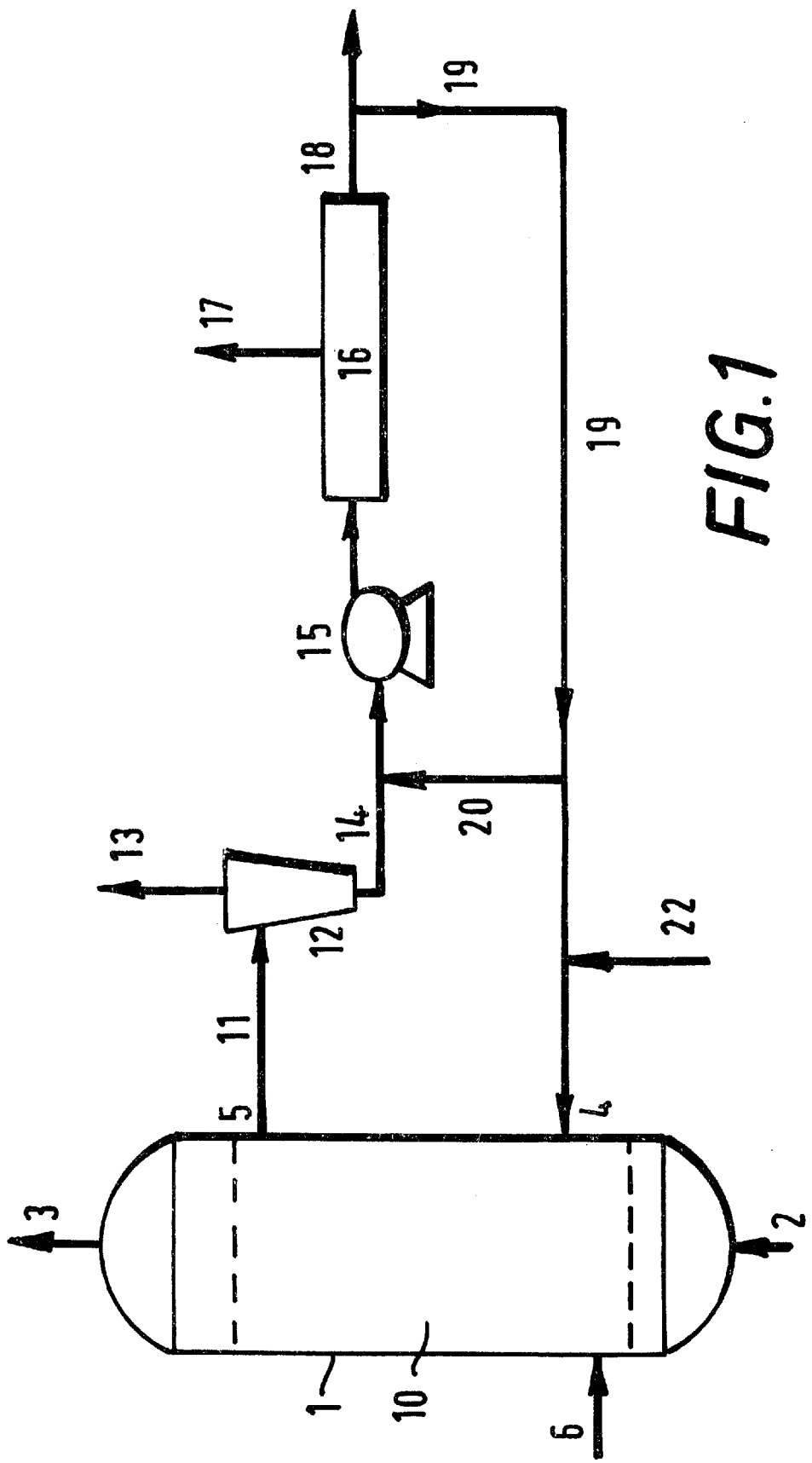

Typically, the solid particles in the slurry are at least in part catalyst particles, and the vessel is typically a reaction vessel in which a process can be carried out, using the slurry contained in the vessel as catalyst bed.

Examples of chemical processes which are carried out in a three-phase slurry reactor are those which make use of solid catalyst particles, use at least one gaseous reactant, produce a product which is liquid under reaction conditions, and which often are highly exothermic. Examples of such processes include hydrogenation processes, hydroformylation, alkanol synthesis, the preparation of aromatic urethanes using carbon monoxide, Kölbel-Engelhardt synthesis, polyolefin synthesis, and Fischer-Tropsch synthesis.

Thus, in a further aspect, the present invention relates to the use of the separation method as described herein in a process involving a chemical reaction, which reaction is carried out in a slurry comprising solid particles, preferably solid catalyst particles.

The liquid present in the slurry is normally at least in part, and preferably substantially completely, a reaction product. The method of the present invention relates to separation of liquid from the slurry. It will be appreciated that if the liquid is only in part a reaction product, further known separation steps, such as adsorption or distillation, may be necessary to isolate the reaction product from the rest of the liquid.

Ways to achieve degasification are known to those skilled in the art. Examples of degasification methods include disengagement and pressure release. Pressure release is in principle feasible, but may be costly and considerably increase the risk of solid (catalyst) particle attrition. Disengagement may take a long time if carried out in a batch or semicontinuous fashion. This may be undesirable at elevated temperature and pressure, for this may induce e.g. cracking of liquid products, coke formation on catalysts or other solid particles, and hydrogenolysis.

It has now been found that a combination of a hydrocyclone for degasification and cross-flow filtration for separation of liquid from the slurry is highly efficient and allows a rapid separation, without the need for depressurization.

Accordingly, in one preferred embodiment of the invention, the slurry is degasified in a hydrocyclone.

A hydrocyclone can be classified as a mechanical separation device in which separation takes place in a centrifugal field. Thus, a hydrocyclone operates in a similar way as a tube centrifuge, the difference being that a hydrocyclone has a non-rotating body, and the centrifugal field is established by a rotating movement of the feed, caused by a tangentially directed inlet.

Thus, according to a broader aspect of the invention, the slurry is degasified in a device in which separation takes place in a centrifugal field. In view of lack of rotating parts and simple maintenance, a hydrocyclone is normally preferred.

Hydrocyclones are known to those skilled in the art, and the skilled person is able to select the most appropriate hydrocyclone for degasification purposes, depending inter alia upon the viscosity of the slurry, the gas hold-up in the slurry and operating conditions. A general overview of hydrocyclones has been published in Ullmann's Encyclopedia of Industrial Chemistry (1988) Fifth edition, Volume B2, pages 11–19 to 11–23.

According to an alternative embodiment of the invention, the degasification step is carried out by a continuous disengagement method.

The method typically involves continuously introducing slurry into a substantially vertical standpipe which is partly filled with slurry, continuously withdrawing gaseous compounds from the upper part of the standpipe not containing slurry, and continuously withdrawing degasified slurry from the lower part of the standpipe, wherein the linear velocity of withdrawing degasified slurry from the standpipe is lower than the upward linear velocity of the gaseous compounds present in the slurry.

The linear velocity of withdrawing degasified slurry from the standpipe is preferably from 0.01 to 0.8 times the upward linear velocity of the gaseous compounds, more preferably from 0.05 to 0.6 times, most preferably from 0.1 to 0.4 times, the said upward linear velocity.

The upward linear velocity depends inter alia on the viscosity of the slurry and may vary between wide limits. Typically, the upward linear velocity will be in the range from 0.1 to 100 cm/sec, preferably from 0.5 to 50 cm/sec, more preferably from 5 to 20 cm/sec.

The continuous disengagement method, like the method using a hydrocyclone, is preferably carried out at substantially the operating pressure in the reactor vessel. Preferably, the slurry inlet of the standpipe is in communication with the slurry zone, and the gaseous compounds outlet is in communication with the freeboard zone of the reactor vessel. It will be appreciated that the standpipe is suitably located inside the reactor vessel, but, preferably, the standpipe is located outside the reactor vessel.

Following degasification of the slurry, the degasified slurry is passed through a cross-flow filter, in order to separate the degasified slurry into the liquid and a concentrated slurry.

Cross-flow filtration is a method known to those skilled in the art wherein the residue (retentate) is continuously removed from the filter by shear of the slurry which flows along the filter, in tangential flow to the filter element. The shear can be produced by rotating elements such as rotating filters or rotors. Preferably, however, the shear is produced by the velocity of slurry through a cross-flow filter containing no rotating elements. A general overview of cross-flow filtration can be found in Kirk-Othmer Encyclopedia of Chemical Technology (1993), volume 10, pages 841–847.

The driving force in the filtration is usually a pressure drop across the filter. Typically, the pressure drop across the filter is in the range from 1 to 10 bar. It will be appreciated that the pressure drop between slurry inlet and slurry outlet is less than the pressure drop across the filter, preferably at least 0.1 bar less than the pressure drop across the filter. Preferably, the said pressure drop difference is not more than 5 bar.

Preferred cross-flow filters typically comprise one or more tubes, wherein at least part of the wall of each tube contains a filter element. The diameter of each tube typically ranges from 0.5 to 4.5 cm. The length of each tube depends upon the desired pressure drop between slurry inlet and slurry outlet.

The slurry velocity along the filters is typically in the range from 1 to 6 m/s. Lower and higher velocities are possible but at a velocity greater than 6 m/s the pressure drop across the filter element should be rather high to generate a reasonable flux of liquid through the filter. At a velocity smaller than 1 m/s, the pressure drop across the filter element should be rather small to enable removal of filter cake by means of shear. This low pressure drop in turn results in a low flux of liquid through the filter.

The solid particles present in the slurry are kept in suspension in the vessel by means of a gas and/or a liquid superficial velocity, or by means of a mechanical mixing device. Thus, it will be appreciated, the maximum possible average particle size of the solid particles may inter alia depend on the gas and liquid velocity, and the density difference between the solid particles and the liquid. Typically, the average particle size is not greater than 1 mm, preferably not greater than 600 $\mu$m.

To allow efficient filtration, typically the average particle size is not smaller than 1 $\mu$m, preferably not smaller than 5 $\mu$m, more preferably not smaller than 10 $\mu$m.

The group of solid particles preferably at least in part consists of catalyst particles. A slurry of catalyst particles having a relatively large average particle size, that is at least 100 $\mu$m, is normally referred to as an ebullating catalyst bed, whereas a slurry of smaller catalyst particles, that is, having an average particle size of less than 100 $\mu$m, is normally referred to as a slurry catalyst bed.

The preferred average catalyst particle size for an ebullating bed ranges from 100 to 400 $\mu$m.

The preferred average catalyst particle size for a slurry bed ranges from 10 to 75 $\mu$m.

If desired, a mixture of catalyst particles and other solid particles may be applied. The other solid particles may have an average particle size which is different from the average particle size of the catalyst particles. Various options have e.g. been discussed in European patent application publication No. 0 450 859.

Due to attrition, the average (catalyst) particle size may decrease with time during operation of the particles. It will be appreciated that the filter pore openings preferably should not allow significant passage of particles, even after some attrition of the particles. Thus, depending on the average size of the particles and the particle size distribution, the pore openings should have a diameter in the range from 0.1 to 50 μm, preferably from 0.5 to 10 μm.

Although in principle it is possible to conduct the method inside the vessel, it is preferred that at least the filter is located outside the vessel. This is inter alia advantageous for maintenance reasons and ease of manufacture. Thus, if the filter has to be inspected, the method may be carried out continuously by using a different filter, without the need for a shut-down of the vessel.

Typically, at least one pump is applied. Suitable pumps are known to those skilled in the art. It will be appreciated that preferably a pump is selected which does not cause significant attrition of the catalyst particles.

The pump may be sensitive for gas and tends to function less properly in the presence of gas. Therefore, according to a preferred embodiment, the slurry is degasified upstream of the pump.

Preferably, at least part of the concentrated slurry is returned to the vessel. It will be appreciated that this is especially preferred if the concentrated slurry contains catalyst particles which are still active in a process which is carried out in the vessel. The circulation of slurry may contribute to, or be fully responsible for keeping the particles in suspension in the slurry.

According to a further preferred aspect of the method, the degasified slurry is separated into a first stream having a low concentration of solid particles and a second stream having a high concentration of solid particles, and the first stream is sent to the filter. In this way, less filter surface area is required, and in view of the low solid particles concentration, the viscosity of the slurry is lower and higher filtration rates are possible. Preferably, at least the second stream is at least partly returned to the vessel. Further advantages of this embodiment include less attrition inter alia due to limited slurry hold-up.

According to a preferred embodiment, the slurry is separated into a first and second stream in a device in which separation takes place in a centrifugal field. In view of lack of rotating parts and simple maintenance, a hydrocyclone is normally preferred.

The above described method is most preferably used in a process for the preparation of heavy hydrocarbons from synthesis gas. As outlined hereinbefore, the term heavy hydrocarbons as used herein refers to hydrocarbons which are liquid under the reaction conditions. Typically, the reaction temperature is chosen in the range from 150 to 400° C. The pressure typically ranges from 5 to 200 bar abs.

Thus, according to another aspect of the present invention, there is provided a process for the preparation of heavy hydrocarbons, which process comprises contacting a synthesis gas in a reactor vessel with a slurry of solid catalyst particles and a liquid, thereby producing heavy hydrocarbons, and separating the liquid containing heavy hydrocarbons from the slurry by the method as described herein.

Hydrocarbon synthesis catalysts, that is catalysts capable of catalysing synthesis of hydrocarbons from hydrogen and carbon monoxide, as well as suitable methods to prepare such catalysts, are known to those skilled in the art. Hydrocarbon synthesis catalysts typically comprise a Group VIII metal, supported on a catalyst carrier. The Group VIII metal is preferably chosen from iron, cobalt and/or ruthenium, more preferably cobalt. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one oxide of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight, preferably from 0.5 to 40 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt : (manganese+vanadium) molar ratio is advantageously at least 12:1.

The liquid present in the slurry is most suitably a product of a hydrocarbon synthesis process, in particular a process as described herein. Alternatively, (refined) crude oil fractions or liquid polyolefins may be used. Preferably, the liquid contains predominantly highly paraffinic hydrocarbons. Typically, a highly paraffinic hydrocarbon liquid contains at least 70% by weight, preferably 80% by weight, and more preferably 90% by weight of paraffinic hydrocarbons.

The hydrocarbon synthesis process is preferably carried out at a temperature in the range from 125 to 350° C., more preferably 170 to 300° C., most preferably 200 to 275° C. The pressure preferably ranges from 5 to 80 bar abs., more preferably from 20 to 60 bar abs.

Hydrogen and carbon monoxide (synthesis gas) is typically fed to the process at a molar ratio in the range from 0.4 to 2.5. Preferably, the hydrogen to carbon monoxide molar ratio is in the range from 1.0 to 2.5.

The gaseous hourly space velocity may vary within wide ranges and is typically in the range from 1500 to 8000 h$^{-1}$.

The process for the preparation of hydrocarbons may be conducted using a slurry catalyst bed regime or an ebullating catalyst bed regime.

It will be understood that the skilled person is capable to select the most appropriate conditions for a specific reactor configuration and reaction regime.

Preferably, the superficial gas velocity of the synthesis gas is in the range from 0.5 to 50 cm/sec, more preferably in the range from 5 to 35 cm/sec.

Typically, the superficial liquid velocity is kept in the range from 0.001 to 4.0 cm/sec, including liquid production. Preferably, the superficial liquid velocity is preferably kept in the range from 0.005 to 1.0 cm/sec.

It will be appreciated that the most preferred superficial liquid velocity may depend on the preferred mode of operation.

If the separation is carried out inside the vessel and a high liquid velocity is not required to keep the catalyst particles in suspension, a relatively low superficial liquid velocity may be preferred. If on the other hand at least part of the separation is carried out outside the vessel, a higher superficial liquid velocity may be preferred. It belongs to the skill of the skilled person to select the most appropriate superficial liquid velocity, having regard to the preferred mode of operation.

As outlined hereinabove, according to a preferred aspect of the invention, at least the filter is located outside the reactor vessel and the separation is carried out at substantially the same pressure as applied in the reactor vessel. Preferably, the installation required for carrying out the method as described herein is located outside the reactor vessel. According to another preferred embodiment, the degasification device is located inside the vessel, and the remaining downstream part of the installation is located outside the vessel.

Hydrocarbon synthesis catalysts generally tend to have activity for hydrogenolysis, which may result in undesired methane formation by cracking of liquid hydrocarbon products, and adiabatic temperature increase. Further, coke may form, affecting catalyst life and activity. It has recently been found that especially in the absence of synthesis gas, and in particular hydrogen, the hydrogenolysis activity is high at high operating temperatures in the slurry. Therefore, according to one preferred embodiment of the invention, at least that part of the slurry that is sent to the filter, is cooled, preferably to a temperature of less than 200° C.

In one embodiment of the invention, at least that part of the slurry that is sent to the filter is cooled to a temperature of less than 185° C., or even less than 180° C. It is usually not necessary nor desired to cool to a temperature of less than 150° C., preferably, not less than 160° C.

It will be appreciated that cooling as such may be time-consuming and costly, especially if the slurry is cooled to a rather low temperature.

An advantage of the separation method of the present invention is that the residence time can be kept to a minimum. Further, if the degasified slurry is separated in a first and second stream, and only the first stream is sent to the filter, the average residence time of catalyst in the separation system is reduced even further. Thus, according to a preferred embodiment, the average residence time of catalyst-containing slurry outside the reactor vessel is kept to less than 10 minutes, more preferably less than 5 minutes, even more preferably less than 1 minute. Typically, the residence time will be more than 10 seconds.

It will be appreciated that a relatively short residence time may reduce the desirability for cooling. According to a particularly preferred embodiment, the part of the slurry that is sent to the filter is cooled to a temperature which is from 5 to 75° C. below reaction temperature, preferably from 10 to 60° C. below reaction temperature, and the residence time is less than 10 minutes; preferably within the above ranges.

It will be appreciated that preferred embodiments of the process, such as cooling and/or separation at substantially reactor vessel pressure, may also be preferred embodiments of the method as such, when used in different set-ups and processes.

Figure 2:
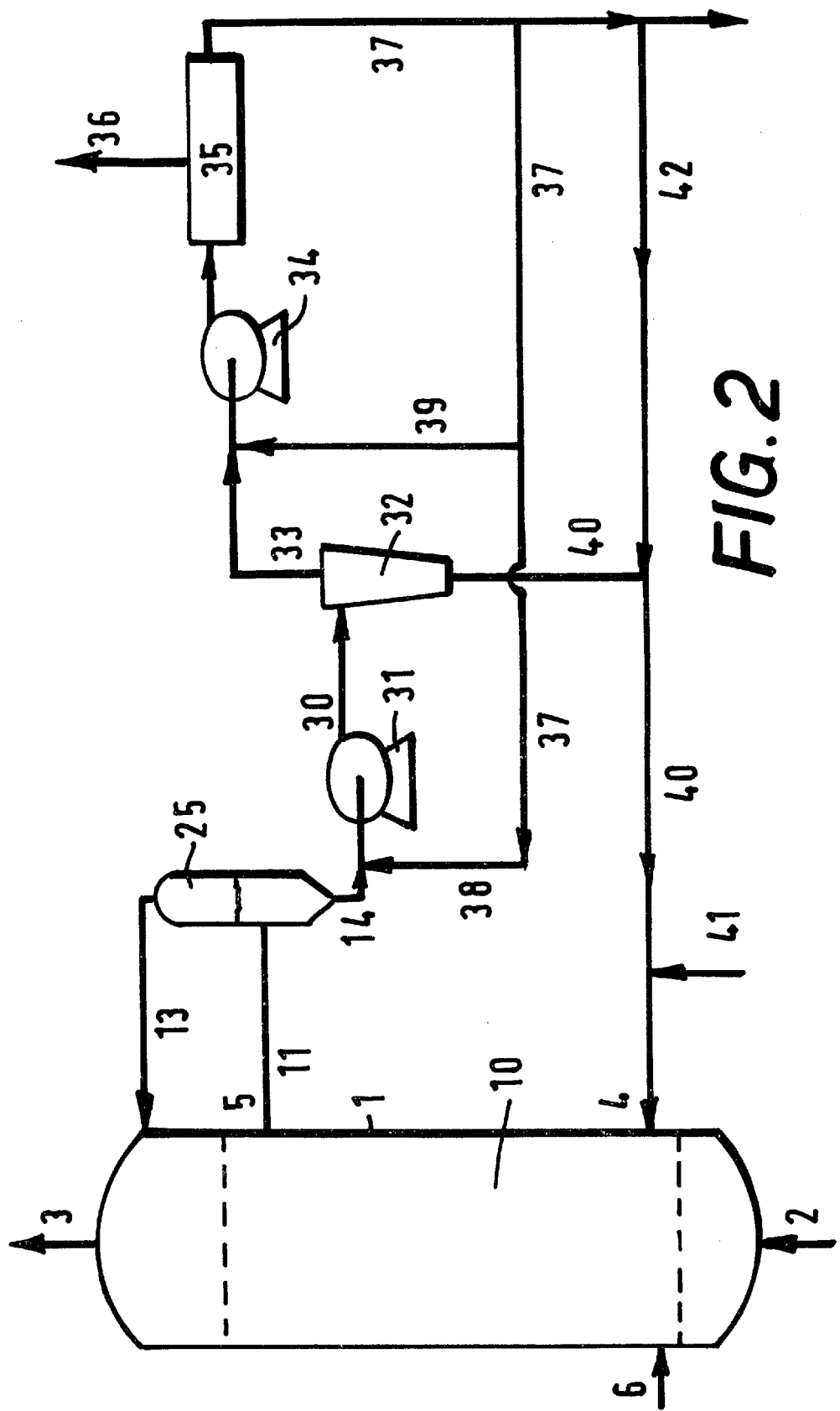

The method and process of the present invention are further set out in detail with reference to FIGS. 1 and 2.

FIG. 1 schematically depicts a flow scheme in which slurry withdrawn from a vessel is degasified up-stream of a pump, and down-stream of the pump the degasified slurry is passed to a cross-flow filter. Concentrated slurry is at least in part returned to the vessel and optionally in part recycled to the filter.

FIG. 2 schematically depicts a flow-scheme in which degasified slurry is separated into a first and a second stream and only the first stream is passed to a cross-flow filter.

With reference to FIG. 1, reference number 1 depicts a reactor vessel, equipped with gas inlet means 2 and gas outlet means 3; slurry inlet means 4 and slurry outlet means 5. If desired, the vessel further contains separate liquid inlet means 6. Other features of the reactor vessel such as cooling means have been omitted for clarity reasons.

In operation, the reactor vessel 1 further contains a slurry 10 of solid particles, typically solid catalyst particles, in a liquid. The solid particles are kept in suspension by a sufficiently high superficial gas velocity, and/or a sufficiently high superficial liquid velocity.

Slurry 10 is passed from the reactor vessel 1 via slurry outlet means 5 and line 11 to hydrocyclone 12. The hydrocyclone 12 comprises a separation chamber of circular cross-section, containing an overflow outlet in communication with line 13 for gas separated from the slurry 10, and an underflow outlet in communication with line 14 for degasified slurry. Line 11 is in communication with at least one tangentially directed feed inlet, proximate to the overflow outlet. The diameter of the separation chamber decreases from the overflow outlet to the underflow outlet, however, this decrease is not necessarily continuous. Optionally, some parts of the separation chamber have a constant diameter in the direction of the underflow outlet.

Alternatively, hydrocyclone 12 is replaced by a standpipe 25, as shown in FIG. 2.

The degasified slurry is passed to a cross-flow filter 16, via pump 15. Liquid filtrate leaves the cross-flow filter via line 17 and concentrated slurry via line 18. At least part of the concentrated slurry may be returned to the vessel 1 via line 19. Optionally, a part of the concentrated slurry is recycled to the cross-flow filter 16 via line 20, line 14 and pump 15.

Part of the concentrated slurry may be withdrawn or new slurry added, via lines 18 and 22 respectively.

Optionally, the degasified slurry is cooled by heat-exchange means (not shown).

With reference to FIG. 2, the reference numbers corresponding with reference numbers in FIG. 1 have the same meaning.

Slurry 10 is passed from the reactor vessel 1 via slurry outlet means 5 and line 11 to standpipe 25. Alternatively, standpipe 25 is replaced by hydrocyclone 12, as shown in FIG. 1.

Gaseous compounds are withdrawn from standpipe 25 and returned to the freeboard zone of the reactor vessel via line 13.

Degasified slurry leaves standpipe 25 via line 14, and is passed via line 30 and pump 31 to hydrocyclone 32.

In hydrocyclone 32, the degasified slurry is separated into a first stream having a low concentration of solid particles and a second stream having a high concentration of catalyst particles.

The hydrocyclone 32 comprises a separation chamber of circular cross-section, containing an overflow outlet in communication with line 33 for the first stream, and an underflow outlet in communication with line 40 for the second stream. Line 30 is in communication with at least one tangentially directed feed inlet, proximate to the overflow outlet. The diameter of the separation chamber decreases from the overflow outlet to the underflow outlet, however, this decrease is not necessarily continuous. Optionally, some parts of the separation chamber have a constant diameter in the direction of the underflow outlet.

The first stream leaves hydrocyclone 32 via line 33 and is passed to cross-flow filter 35, via pump 34. Liquid filtrate leaves the cross-flow filter 35 via line 36. A concentrated slurry stream leaves the cross-flow filter 35 via line 37. Optionally, this concentrated slurry stream is in part or fully recycled to the cross-flow filter 35 via line 38 to line 30. According to a further embodiment, this concentrated slurry stream is partly or fully recycled to line 33 rather than line 30 via line 39. Preferably, this concentrated slurry is partly or fully recycled to reactor vessel 1 via line 42 and 40.

The second stream leaves hydrocyclone 32 via line 40. At least part of the second stream is returned to the reactor vessel 1 via line 40. Optionally, slurry is withdrawn from the recycle, or new slurry added via line 41.

Optionally, the degasified slurry and/or the first stream, preferably the first stream, is cooled by a heat-exchange means (not shown).

With reference again to FIG. 1, a typical process scenario for the preparation of heavy hydrocarbons, would be as follows.

Synthesis gas, having a hydrogen to carbon monoxide molar ratio of about 2:1, is introduced into reactor vessel 1 via gas inlet means 2. Unconverted gas as well as gaseous products leave the reactor vessel via gas outlet means 3.

The slurry 10, contains about 30% by volume of catalyst, on a gas-free basis. The catalyst typically comprises cobalt on a porous carrier, such as silica, alumina, zirconia or titania. The average particle size of the catalyst particles is in the range from 10 to 50 _m. The slurry liquid is a mixture of heavy hydrocarbons produced in the process.

100 m3/h of slurry 10 is withdrawn from the reactor vessel 1 via slurry outlet means 5 and is passed via line 11 to hydrocyclone 12. 10 m3/h of gas leaves hydrocyclone 12 via line 13 and 90 m3/h of degasified slurry is passed from hydrocyclone 12 to cross-flow filter 16 via line 14 and pump 15. In line 14, the degasified slurry is optionally combined with 10 m3/h of concentrated slurry containing 35% by volume of catalyst, which is recycled from cross-flow filter 16 via line 20. 13 m3/h of liquid filtrate is withdrawn from the cross-flow filter 16 via line 17. 77 m3/h of concentrated slurry, containing 35% by volume of catalyst is passed to and introduced in the reactor vessel 1, via line 19 and slurry inlet means 4, and 10 m3/h of concentrated slurry is optionally recycled to the cross-flow filter 16 via line 20.

With reference to FIG. 2, a typical process scenario for the preparation of heavy hydrocarbons, would be as follows.

The reactor vessel 1 is operated in the same way, using the same catalyst as described in the process scenario of FIG. 1. 100 m3/h of slurry 10 is withdrawn from reactor vessel 1 via slurry outlet means 5 and is passed via line 11 to standpipe 25.10 m3/h of gas leaves standpipe 25 via line 13 and 90 m3/h of degasified slurry is passed from standpipe 25 to hydrocyclone 32 via line 14, line 30 and pump 31. In hydrocyclone 32, the slurry is separated into a first stream of 15 m3/h containing 5% by volume of catalyst and a second stream of 75 m3/h containing 35% by volume of catalyst. The second stream is returned to reactor vessel 1 via line 40.

The first stream is passed to cross-flow filter 35. 13 m3/h of liquid filtrate is withdrawn from the cross-flow filter 32 via line 36. 2 m3/h of a concentrated first stream of slurry containing 35% by volume of catalyst, leaves cross-flow filter 35 via line 37 and is returned to reactor vessel 1 via lines 42 and 40.

Thus, it will be appreciated that, as compared with the embodiment of FIG. 1, in the embodiment of FIG. 2, a much smaller slurry stream, having a lower catalyst concentration has to be passed through the filter for the same production of liquid filtrate.

We claim:

1. A method for separating liquid from a slurry of solid particles and liquid contained in a vessel in the presence of a gas, said method comprising:

degasifying the slurry;

passing the degasified slurry through a cross-flow filter; and separating the degasified slurry into the liquid and a concentrated slurs;

wherein the slurry is degasified in a device in which separation takeslace in a centrifugal field.

2. A method according to claim 1, wherein the centrifugal field is a hydrocyclone.

3. A method according to claim 1, wherein the slurry is degasified by a continuous disengagement method.

4. A method according to claim 1, wherein the degasified slurry is separated into a first stream having a low concentration of solid particles and a second stream having a high concentration of solid particles, and the first stream is sent to the filter.

5. A method for separating liquid from a slurry of solid particles and liquid contained in a vessel in the presence of a gas, said method comprising:

degasifying the slurry;

passing the degasified slurry through a cross-flow filter; and separating the degasified slurry into the liquid and a concentrated slurry;

wherein the slurry is degasified by a continuous disengagement method comprising continuously introducing slurry into a substantially vertical standpipe which is partly filled with slurry; continuously withdrawing gaseous compounds from an upper part of the standpipe not containing slurry, and continuously withdrawing degasified slurry from a lower part of the standpipe, wherein the linear velocity of withdrawing degasified slurry from the standpipe is lower than the upward linear velocity of the gaseous compounds present in the slurry.

6. A method for separating liquid from a slurry of solid particles and liquid contained in a vessel in the presence of a gas, said method comprising:

degasifying, the slurry;

passing the degasified slurry through a cross-flow filter; and separating the degasified slurry into the liquid and a concentrated slurry;

wherein the filter is located outside the vessel.

7. A method according to claim 6, wherein at least one pump is applied, and wherein upstream of the pump, the slurry is degasified, and wherein at least part of the concentrated slurry is returned to the vessel.

8. A method for separating liquid from a slurry of solid particles and liquid contained in a vessel in the presence of a gas, said method comprising:

degasifying the slurry;

passing the degasified slurry through a cross-flow filter; and separating the degasified slurry into the liquid and a concentrated slurry;

wherein the degasified slurry is separated in a hydrocyclone into a first stream having a low concentration of solid particles and a second stream having a high concentration of solid particles, and the first stream is sent to the filter.

* * * * *